(12) United States Patent
Mass

(10) Patent No.: US 8,512,851 B2
(45) Date of Patent: Aug. 20, 2013

(54) WRAPPING MATERIAL WITH OPPOSING ADHESIVE MEANS

(75) Inventor: Nissim Mass, Ha'Emek (IL)

(73) Assignee: Tama Plastic Industry (IL)

( * ) Notice: Subject to any disclaimer, the term of this patent is extended or adjusted under 35 U.S.C. 154(b) by 824 days.

(21) Appl. No.: 12/113,720

(22) Filed: May 1, 2008

(65) Prior Publication Data
US 2009/0274881 A1    Nov. 5, 2009

(51) Int. Cl.
*B32B 3/10* (2006.01)
*B32B 7/12* (2006.01)
*B32B 7/14* (2006.01)
*B65D 65/14* (2006.01)

(52) U.S. Cl.
USPC ....... 428/195.1; 428/40.1; 428/189; 428/192; 428/343; 428/354; 428/906; 206/83.5; 206/597; 229/87.01

(58) Field of Classification Search
None
See application file for complete search history.

(56) References Cited

U.S. PATENT DOCUMENTS

| | | |
|---|---|---|
| 1,331,367 A | 2/1920 | Petermann |
| 1,452,100 A | 4/1923 | Wheildon |
| 1,557,881 A | 10/1925 | Rogers |
| 2,539,725 A | 1/1951 | Caraher |
| 3,049,228 A * | 8/1962 | Burnett .................. 206/390 |
| 3,056,245 A | 10/1962 | Baum et al. |
| 3,120,727 A | 2/1964 | Ziliox |
| 3,138,841 A | 6/1964 | Naimer |
| 3,623,485 A | 11/1971 | Price |
| 3,654,049 A | 4/1972 | Ausnit |
| 3,733,769 A | 5/1973 | Van Doorn |
| 3,797,650 A | 3/1974 | O'Brien et al. |
| 3,816,970 A | 6/1974 | Van Doorn et al. |
| 4,157,754 A | 6/1979 | Bartsch et al. |
| 4,318,264 A | 3/1982 | Rewitzer |
| 4,333,602 A | 6/1982 | Geschwender |
| 4,505,424 A | 3/1985 | Chappars |

(Continued)

FOREIGN PATENT DOCUMENTS

| | | |
|---|---|---|
| CA | 739282 | 7/1966 |
| CH | 598080 A * | 4/1978 |

(Continued)

OTHER PUBLICATIONS

English Abstract of CH 598080 A, Apr. 1978.*

(Continued)

*Primary Examiner* — David Sample
*Assistant Examiner* — Jeff Vonch
(74) *Attorney, Agent, or Firm* — Lerner, David, Littenberg, Krumholz & Mentlik, LLP

(57) ABSTRACT

A wrapping material for use with existing wrapping equipment or balers for wrapping bales of agricultural produce or other items are disclosed. The base wrapping material may be a netting, film, or combination thereof. The wrapping material includes a plurality of pre-defined, discrete, spaced-apart adhesive areas disposed on each side of the opposing sides of the wrapping material. The longitudinal spacing of the adhesive areas allows the wrapping material to be rolled onto a roll core so that the discrete spaced-apart adhesive areas contact only non-adhesive areas of the wrapping material thereby forming a first level of adhesion that easily allows the wrapping material to be released and unrolled. When wrapping an item, corresponding discrete adhesive areas come into face-to-face contact thereby forming a second level of adhesion that is stronger than the first level of adhesion.

9 Claims, 5 Drawing Sheets

(56) References Cited

U.S. PATENT DOCUMENTS

| | | | |
|---|---|---|---|
| 4,556,167 A | 12/1985 | Fox et al. | |
| 4,628,709 A | 12/1986 | Aeschbach et al. | |
| 4,679,851 A | 7/1987 | Solie et al. | |
| 4,703,605 A | 11/1987 | Ackermann | |
| 4,753,182 A | 6/1988 | Blackburn | |
| 4,775,310 A | 10/1988 | Fischer | |
| 4,901,855 A | 2/1990 | Furukawa | |
| 5,012,631 A | 5/1991 | Hostetler et al. | |
| 5,111,931 A | 5/1992 | Gombos et al. | |
| 5,152,125 A | 10/1992 | Laver | |
| 5,181,364 A * | 1/1993 | Weder | 53/397 |
| 5,344,016 A * | 9/1994 | Weder et al. | 206/451 |
| 5,347,789 A * | 9/1994 | Weder | 53/397 |
| 5,408,803 A * | 4/1995 | Weder et al. | 53/399 |
| 5,457,855 A | 10/1995 | Kenney et al. | |
| 5,537,800 A | 7/1996 | Weder | |
| 5,636,739 A | 6/1997 | Weder et al. | |
| 5,687,469 A | 11/1997 | Weder | |
| 5,732,531 A | 3/1998 | de Silva et al. | |
| 6,260,487 B1 * | 7/2001 | Giorgio | 108/51.11 |
| 6,425,322 B1 | 7/2002 | Karlsson et al. | |
| 6,443,187 B1 | 9/2002 | Wang et al. | |
| 6,453,805 B1 | 9/2002 | Viaud et al. | |
| 6,644,498 B1 * | 11/2003 | Lemberger et al. | 221/33 |
| 6,787,209 B2 | 9/2004 | Mass et al. | |
| 6,984,431 B2 | 1/2006 | Mass et al. | |
| 2003/0082345 A1 * | 5/2003 | Hamilton et al. | 428/173 |
| 2004/0121108 A1 | 6/2004 | Mass et al. | |
| 2005/0034429 A1 * | 2/2005 | Mass et al. | 53/465 |

FOREIGN PATENT DOCUMENTS

| | | |
|---|---|---|
| CN | 2346790 Y | 11/1999 |
| DE | 35 25294 A1 | 1/1987 |
| DE | 19 833554 A1 | 1/1999 |
| EP | 0 233 471 A1 | 8/1987 |
| EP | 0 324577 A1 | 7/1989 |
| EP | 0 608871 A2 | 3/1994 |
| EP | 1 321028 A1 | 6/2003 |
| EP | 1 369516 A1 | 12/2003 |
| FR | 398 606 | 6/1909 |
| GB | 2 221 841 | 2/1990 |
| GB | 2 348 633 A | 10/2000 |
| GB | 2349128 A * | 10/2000 |
| WO | WO 90/08708 | 8/1990 |
| WO | WO 9219508 A1 * | 11/1992 |
| WO | WO 2005/003589 A1 | 1/2005 |

OTHER PUBLICATIONS

International Search Report for PCT/IB08/01089 mailed Nov. 10, 2008.

Office Action from Chinese Application No. 200880128676, dated Sep. 14, 2011.

\* cited by examiner

WRAPPING MATERIAL WITH OPPOSING ADHESIVE MEANS

FIELD OF THE INVENTION

The present invention relates to a variety of wrapping materials, and in particular wrapping materials including a plurality of discrete adhesive areas disposed on opposing surfaces of a base wrapping material in a predetermined manner.

BACKGROUND

The use of "round" wrapping or baling machines (hereinafter "baler") for baling agricultural produce such as hay, straw, silage, or cotton into a "round" bale (referring to a generally cylindrically-shaped bale having a generally round cross-section) has become increasingly common in recent years. Due to at least financial and technical considerations, such round balers are replacing older systems of baling cubic-type bales, which have a generally square cross-section and are secured by different types of metal wire, sisal twine, or baling twine made from polypropylene or polyethylene. The first round-balers also used various types of twines to secure the bale. Over the years, however, different types of netting and plastic films have been used to wrap and secure square or round bales, thereby replacing the use of various types of securing wire or twine.

The use of netting, and in particular knitted Raschel netting, has become more common for wrapping bales of agricultural produce. Nettings, however, are primarily open, in that the knitted ribbons that make-up the netting only account for part of the surface area of the bale and do not protect the bales from forces of nature such as rain, humidity, snow, hail, or wind. Wrapping materials made from plastic films provide improved protection of the wrapped produce from the forces of nature, as it is common for agricultural produce to remain wrapped in an open field for a time period that could vary from several months to more than a year before use. One such plastic film is commonly known as "sticky film," which includes plastic films that inherently cling to itself or plastic films that include an adhesive applied to the complete surface area of at least one side of the plastic wrap or across the entire lateral dimension, i.e., from lateral end to lateral end. With the adhesive disposed at the lateral edges and along the longitudinal length of such wrapping material, the ease and progress of the wrapping material through the baler is greatly impeded by frictional-type interference and jams that decrease productivity and increase cost. Other problems inherent with "sticky films" result from, for example, dusty conditions, moisture, or wind. Under these and other conditions, it is typical for the adhesive securing the tail end of the wrapping material to become loose after a short time. Once the tail end of a wrapped bale becomes loose, continued exposure to wind and moisture will cause the tail to flutter about and the wrap will ultimately unravel and break open, thereby minimizing precious storage time.

An additional disadvantage with the use of previously-known adhesive films is that the adhesiveness of the film is uniform on both sides or on one side only. Consequently, the accepted use is with materials with a given level of adhesion that is imparted during the manufacturing process of the wrapping material. It is possible to obtain materials that are adhesive on one side or both sides. In each of these cases, the entire surface area is adhesive and the level of adhesion is limited to the strength required to release the wrapping material from the roll of material. There are two distinct disadvantages with this method: (1) the limited level of adhesion, and (2) the adhesive is over the entire wrapping area.

SUMMARY

With the foregoing in mind, the wrapping materials of the present invention provide a solution to the deficiencies of the prior art.

The wrapping materials of the present invention may be used to wrap round bales of agricultural produce although such wrapping materials can be used to wrap bales of other shapes or items that are not agriculturally related. The wrapping materials of the present invention may be used with existing wrapping equipment or balers.

The wrapping material may be a continuous wrapping material that includes a plurality of wrapping units wherein each wrapping unit comprises a base wrapping material, which may be a netting, film, breathable film, or a combination thereof, and a plurality of predefined, discrete, spaced-apart adhesive areas disposed on each side of the opposing sides of the base wrapping material. Each wrapping unit may also be serially connected or attached to at least another wrapping unit to form a continuous wrapping material. In addition, each of the plurality of discrete adhesive areas may have a width that is smaller than the width of the base wrapping material, thereby forming a non-adhesive strip at each opposing lateral edge along the length of the wrapping material. The size and spacing of the discrete adhesive areas may also be predetermined so that none of the plurality of the discrete spaced-apart adhesive areas on the top or bottom surface contacts any of the other discrete spaced-apart adhesive areas on the other of the top or bottom surface.

DETAILED DESCRIPTION OF THE EMBODIMENTS

Figure 1A:
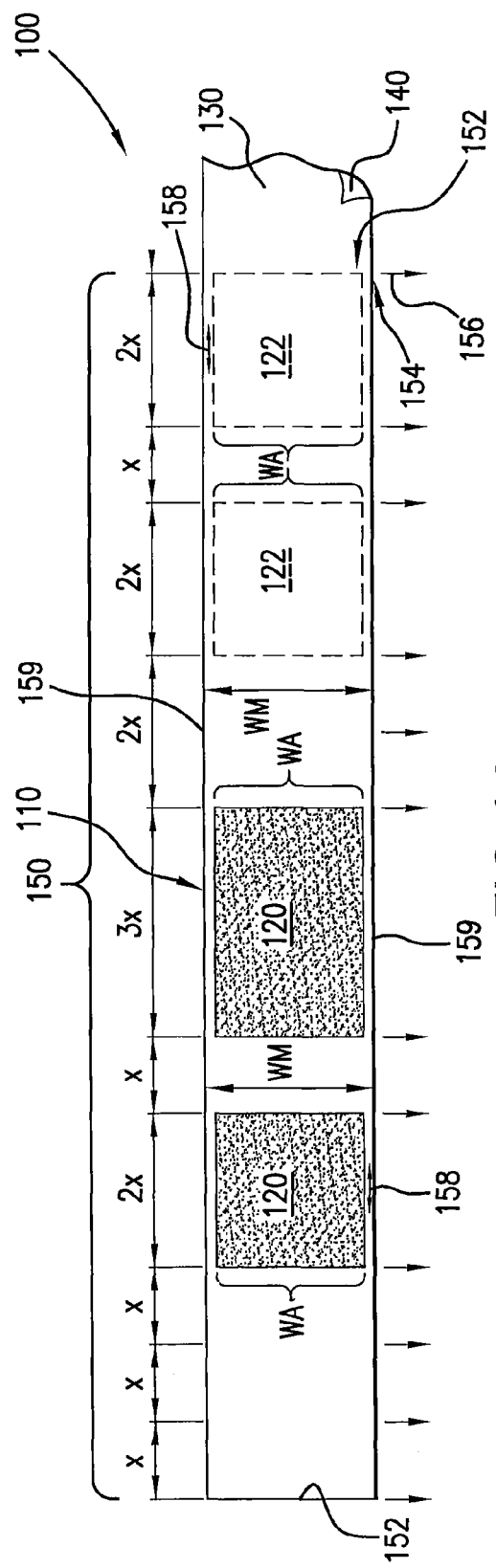
FIG. 1A is an elevated view of the wrapping material in accordance with an exemplary embodiment.

The non-limiting embodiments and examples of the present invention will now be described with reference to FIGS. 1A-6. Like reference characters and designations throughout the figures refer to like elements.

The base wrapping material may comprise netting, film, breathable film, adhesive film, a netting/film composite, or other materials suitable for wrapping that have two sides or surfaces, i.e., a first, upper, or top surface, and a second, lower, or bottom surface. Film, in particular a polymeric film, is the preferred base wrapping material, although the embodiments are not limited to the use of a film. Breathable films include films that are impermeable, for example, to liquid water, but permeable, for example, to water vapor. On this basis, a breathable film will effectively prevent external water from passing through the wrapping material and into the wrapped bale and, at the same time, allow water vapor to escape from the interior of the bale through the wrapping material.

The wrapping material may utilize a plurality of pre-defined, discrete, spaced-apart adhesive areas disposed on each of the opposing top and bottom surfaces of the wrapping material. During the production process of the wrapping material, the wrapping material may, preferably, be rolled onto a roll core. In order to avoid undesirable adhesion on the rolled wrapping material, the two-dimensional size of each of the discrete adhesive areas and the longitudinal spacing between adjacent discrete adhesive areas may be predetermined so that none of the plurality of the discrete spaced-apart adhesive areas on the top or bottom surface come into contact with any of the other discrete spaced-apart adhesive areas on the other of the top or bottom surface. That is, each of the plurality of adhesive areas preferably contacts only an overlying or underlying portion of the base wrapping material when the wrapping material is rolled on the roll core, thereby providing an easily releasable, relatively low-level adhesion for ensuring that the roll of wrapping material will remain rolled until use. This arrangement facilitates the unrolling and feeding of the rolled wrapping material into and through the wrapping machine or baler. Although no contact between any two or more of the plurality of adhesive areas of the rolled wrapping material is preferred, it should be understood that some contact between adhesive areas may occur without changing the scope or spirit of this novel wrapping material.

It is possible to roll or wind a great number of individual wraps or wrapping units on a single roll core. The width and length of each individual roll core is determined according to market requirements and the dimensions of the item or bale that needs to be wrapped. The quality of each individual wrap is a function of the wrapping material, such as the thickness of the wrap, the required length of the wrap, the maximum diameter of the roll core of wrapping material, and the desired maximum weight. The roll of wrapping material may be manufactured in an endless continuity, i.e., a continuous roll wherein the wrapping material is a continuous film and the wrapping units may be separated by means of a cut mark, weakening, perforation, or the like between individual wraps or wrapping units, or the wrapping units may be attached or connected to form a continuous wrapping material. It is also possible to implement marks along the entire length of the continuous roll of wrapping material, wherein the marks identify the beginning and ending points of each connecting wrapping unit as a required cut-off point and at least the wrapping machine or baler may cut and release a wrapping unit from the continuous roll during a wrapping cycle.

In accordance with another aspect of the exemplary embodiment, during a wrapping cycle, the bonds between the plurality of discrete adhesive areas and their respective overlying or underlying base wrapping material separate relatively easily when unrolled from the storage roll core. As the wrapping material is unrolled and wrapped around the item or produce during a wrapping cycle, each of the plurality of discrete adhesive areas disposed on the top or bottom surface comes into intimate face-to-face contact with a corresponding discrete adhesive area that is disposed on the other of the top or bottom surface of the wrapping material. With this face-to-face meeting and the bonding of respective discrete adhesive areas, a relatively high level of adhesion between the corresponding bonded adhesive areas is achieved. In the simplest case, for example, each of the discrete adhesive areas will comprise the same or identical adhesive material, which will, in face-to-face contact, provide for an adhesion or adhesive force that is at least twice as strong as the adhesion or adhesive force between each discrete adhesive area and the overlying or underlying base wrapping material when the wrapping material is rolled on the roll core. If necessary, stronger adhesive bonds can be obtained when corresponding adhesive areas are made from at least two different adhesive materials. The use of at least two different adhesive materials also allows for the option of using various materials that can create a chemical connection when corresponding adhesive areas come into face-to-face contact during the wrapping cycle.

In accordance with a further aspect of an embodiment of the present invention, the wrapping material also solves the demand for preventing adhesion at both edges of each surface of the wrapping material along the length of the wrapping material. This demand arose from the need to prevent friction between the agricultural apparatus walls and the wrapping material. In order to prevent the corresponding discrete adhesive areas on the first and second surfaces of the wrapping material from coming into contact during the winding process onto the storage roll core, a given length from one or both edges of each of the wrapping units may be adhesive free. These given or predetermined lengths are derived from the circumference of the rolled wrapping material. For example, if the roll diameter is 30 cm, a non-adhesive length of 100 cm from one or both edges of each wrapping unit should be included. This requirement does not create a problem due to the fact that it is possible to fully govern those areas to which the plurality of discrete adhesive areas are applied.

Determination of the plurality of discrete adhesive areas and their respective placement on each surface of the base wrapping material is carried out during preparation of the roll. Placement of the plurality of discrete adhesives areas on each surface of each wrapping unit may be carried out at any time by any one or more currently known and acceptable methods, which include, for example, spreading, spraying, immersion, or other known methods. Each of these methods may be implemented regardless of the type of base wrapping material used, e.g., natural, polymeric, netting, film, or netting/film composite.

Another aspect of an embodiment of the present invention provides for placement of adhesive on the trailing end of the wrapping material, for example on either the first, upper, or top surface, or the second, lower, or bottom surface, to ensure that the trailing end adhesive area will meet with a corresponding discrete adhesive area during the wrapping cycle to secure the trailing end of the wrapping material with a relatively high adhesion. With this and other face-to-face adhesions of the wrapping material around the wrapped item or bale, the greatest adhesion, as a whole, is achieved in the trailing end and other important wrapping areas.

Implementation of this wrapping material is based on wrapping material having wrapping units with lengths and configurations of pre-defined adhesive areas for bales of known dimensions and for wrapping items or agricultural produce in an individual manner. The dimensions of the present wrapping material, that is, the dimensions of each wrapping unit or wrapping portion, are derived from the physical properties and proportions of the item, product, or produce to be wrapped. A plurality of discrete adhesive segments is disposed in predetermined areas on each surface of the wrapping unit. In this manner, during a wrapping cycle, each of the adhesive areas on the upper surface, for example, comes into face-to-face contact with a corresponding adhesive area on the bottom surface of the wrapping material, and vice versa. As a result of this face-to-face contact of corresponding adhesive areas, the highest level of adhesion can be obtained and achieved, which is not limited to the value of strength required in order to release the wrapping material from the roll as currently exists. The face-to-face contact between corresponding adhesive areas also ensures that none, or substantially none, of the adhesive of any of the plurality of adhesive areas, regardless of the surface they are disposed on, contacts or adheres to the crop, produce, or item being wrapped during the initial wrapping process. At the end of each wrapping process, each wrapping unit, segment, or portion will be secured in wrapping engagement about the wrapped item, crop, or produce by a plurality of pairs of corresponding discrete adhesive areas in face-to-face engagement.

Figure 1B:
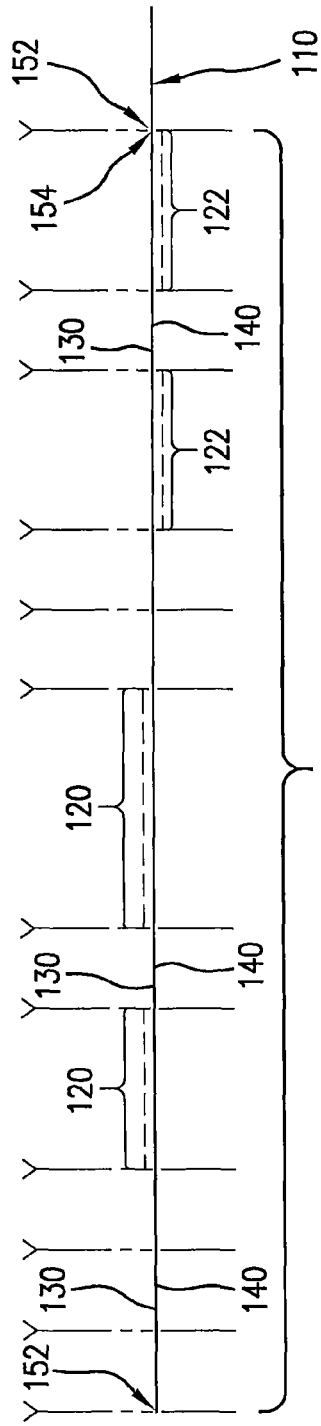
FIG. 1B is a cross-sectional view of the wrapping material in accordance with an exemplary embodiment.
Figure 5:
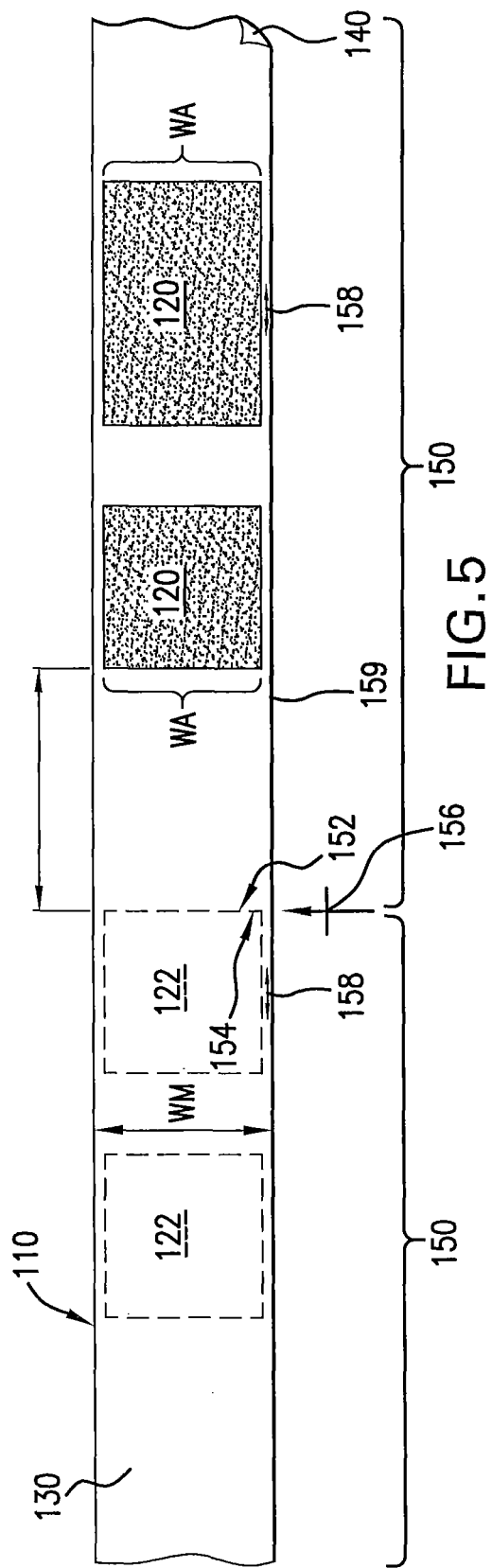
FIG. 5 is an elevated view of the wrapping material in accordance with an exemplary embodiment.

The exemplary embodiment in FIG. 1A includes a wrapping material 100 comprising a base wrapping material 110 and a plurality of discrete spaced-apart adhesive areas 120 and 122. FIG. 1B shows, in cross-section, the general structure and locations of the base wrapping material 110 and the plurality of discrete adhesive areas 120 and 122 relative to the elevated view in FIG. 1A. The base wrapping material 110 may comprise a netting, film, breathable film, adhesive film, a netting/film composite, or other materials suitable for wrapping. A preferred base wrapping material 110 comprises a polymeric film, although other materials may be used. Although only one complete wrapping unit 150 is shown in FIGS. 1A and 1B, the continuous wrapping material 100, as a whole, comprises a series of connected wrapping units or portions 150. Each wrapping unit 150 includes a leading edge 152 and a trailing edge 154. With the exception of the first and last wrapping units 150 of the series of connected wrapping units 150, the leading edge 152 of each wrapping unit 150 connects to the trailing edge 154 of a neighboring wrapping unit 150. FIGS. 1A, 1B, and 5 show a leading edge 152 connected to a trailing edge 154. Each connection point between a leading edge 152 and a trailing edge 154 also comprises a separation or disconnection means 156 that allows each wrapping unit to be separated or disconnected from the continuous roll during a wrapping cycle. To facilitate separation, each separation means 156 comprises a cut mark, weakening, perforation, line of perforations, or the like, on, in, or through the base wrapping material 110. It is also possible to implement at least one mark located on or substantially on the connection point or line between the leading edges 152 and the trailing edges 154 so as to identify the location of each separation means 156 for use by the wrapping machine or operator for triggering a separation process that, for example, tears, cuts, or otherwise separates the leading wrapping unit 150 from the continuous roll of wrapping material during a wrapping cycle. Such marks may form a part of the separation means 156 or be spaced away from the separation means 156 as might be needed by either the wrapping machine or operator to adequately perform the separation process mentioned above.

FIGS. 1A and 1B also illustrate the general size, shape, and location of each of the plurality of discrete spaced-apart adhesive areas 120 and 122. The plurality of discrete spaced-apart adhesive areas 120 are applied to a first, upper, or top surface 130 of the base material 110, and the plurality of discrete spaced-apart adhesive areas 122 are applied to the second, lower, or bottom surface 140 of the base material 110. As depicted in the embodiments shown in FIGS. 1A and 5, the width WA of each adhesive area is smaller than the width WM of the base wrapping material 110 so as to provide an adhesive-free lateral strip 158 at each lateral edge 159 along the longitudinal length of the continuous base wrapping material 110. These adhesive-free lateral strips 158 facilitate the flow or movement of the wrapping material 100 through the wrapping or baling machine by minimizing frictional-type forces that would otherwise be significant with the use of currently-known "sticky film," which includes adhesive over the entire width thereof. Lateral strips 158, as discussed above, provide an advantage over previously-known wrapping materials that have an adhesive applied over the entire top and/or bottom surface thereof.

The approximate longitudinal size and spacing of the plurality of discrete spaced-apart adhesive areas 120 and 122 are shown in FIGS. 1A and 1B. The approximate longitudinal length of each wrapping unit 150, relative to the circumference of the item I to be wrapped, is best shown in the cross-sectional views of FIGS. 2 and 6 and the perspective view of FIG. 3. Here, the longitudinal length of each wrapping unit 150 is shown as being approximately two times the circumference of the item I being wrapped, although it is understood that the actual length of the wrapping unit 150 may be longer or shorter depending on the specific need. By way of example only, FIGS. 1A and 1B show a wrapping unit 150 having an overall longitudinal length of 16X, wherein X represents the distance between the adhesive areas 120 applied to the surface 130 of the wrapping unit 150 as well as the distance between the adhesive areas 122 applied to the opposing surface 140 of the wrapping unit 150. FIG. 4 shows a roll R of continuous wrapping material 100 having an outside diameter $D_R$ and a roll core having an outside diameter of $d_c$. The outside diameter $D_R$ is the distance between the two opposing arrows $D_R$ shown in FIG. 4. The outside diameter $d_c$ of the roll core is the distance between the opposing arrows $d_c$ also shown in FIG. 4. In order to prevent conditions in which the adhesive areas 120 would come into contact with the adhesive areas 122 during the production and rolling processes, the distance between the inner adhesive area 120 and inner adhesive area 122 should be longer than the outside circumference of the roll R. FIG. 1A demonstrates an embodiment in which the adhesive areas 120 and the adhesive areas 122 (of the same unit 150) do not contact during the production and rolling processes and the distance between the inner adhesive area 120 and the inner adhesive area 122, which is denoted as 2X, is longer than the circumference of the roll such that $2X > (\pi * D_R)$.

By way of example, FIGS. 1A and 1B illustrate a non-limiting embodiment of the present wrapping material 100 in which the wrapping units 150 have a longitudinal length 16X that, as noted above, would approximately represent a length of two times the circumference of the item I to be wrapped. For this illustrated example, $X = 2\pi D_B/16$, wherein $D_B$ represents the outside diameter of bale B. In this example, the first, upper, or top surface 130 of the wrapping unit, from its leading edge 152 to its trailing edge 154, comprises sections in the following order: a minimum 3X leading section of base material without adhesive that commences from the leading edge, a 2X adhesive area 120 section, an X section of base material (the distance between the adhesive areas 120), a 3X adhesive area 120 section, and a 7X section of base material without adhesive that terminates at the trailing edge 154. In this same example, the opposing second, lower, or bottom surface 140 of the same wrapping unit, from its leading edge 152 to its trailing edge 154, comprises sections in the following order: an 11X leading section of base material without adhesive commencing at the leading edge, a 2X adhesive area 122 section, an X section of base material (the distance between the adhesive areas 122), and a 2X adhesive area 120 section that terminates at the trailing edge 154. With these general arrangements and configurations, the entire wrapping unit 150, as a whole, comprises a serial combination of sections from its leading edge 152 to its trailing edge 154 in the following order: a minimum 3X leading section of base material with no adhesive along both surfaces 130 and 140 commencing from the leading edge 152, a 2X adhesive area 120 section on the top surface 130 only, an X section of base material with no adhesive on both the top surface 130 and bottom surface 140, a 3X adhesive area 120 section on the top surface 130 only, a 2X section of base material with no adhesive on both the top surface 130 and the bottom surface 140, a 2X adhesive area section on the bottom surface 140 only, an X section of base material on both the bottom surface 140 and the top surface 130, and a 2X adhesive area 120 section on the bottom surface 140 only that terminates at the trailing edge 154.

Figure 2:
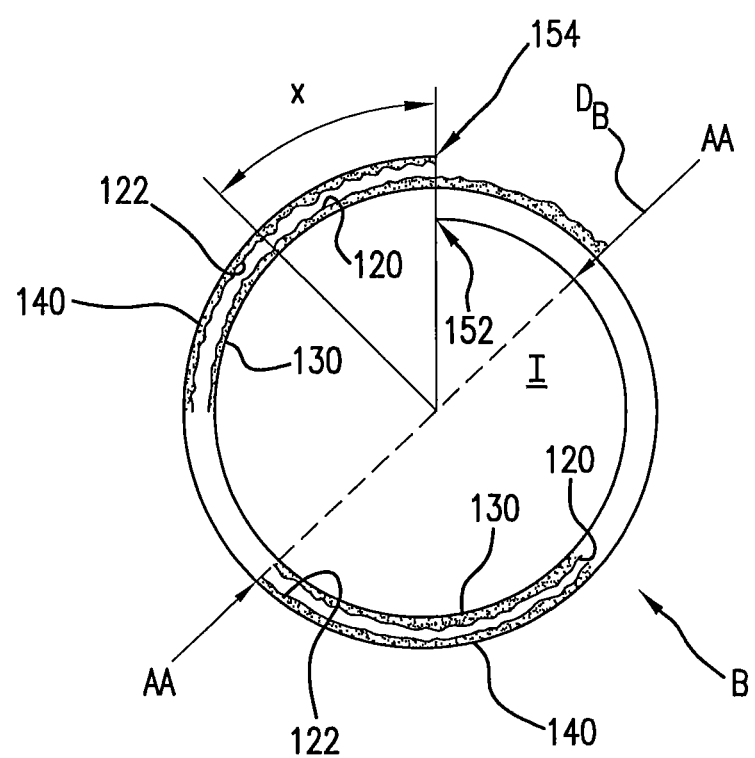
FIG. 2 is a cross-sectional view of a bale wrapped with the wrapping material in accordance with an exemplary embodiment.
Figure 3:
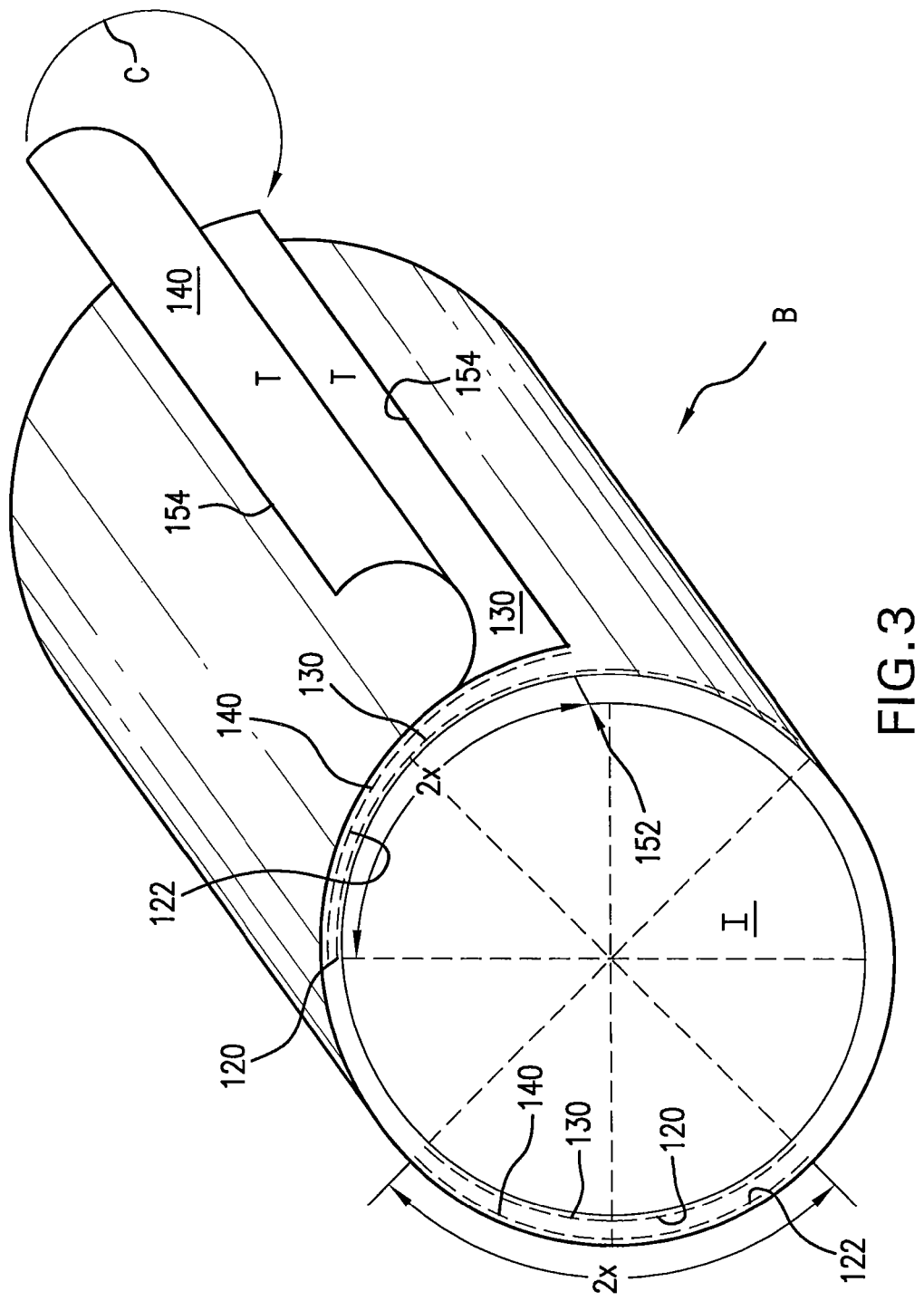
FIG. 3 is a perspective view of a bale wrapped with the wrapping material in accordance with an exemplary embodiment.
Figure 4:
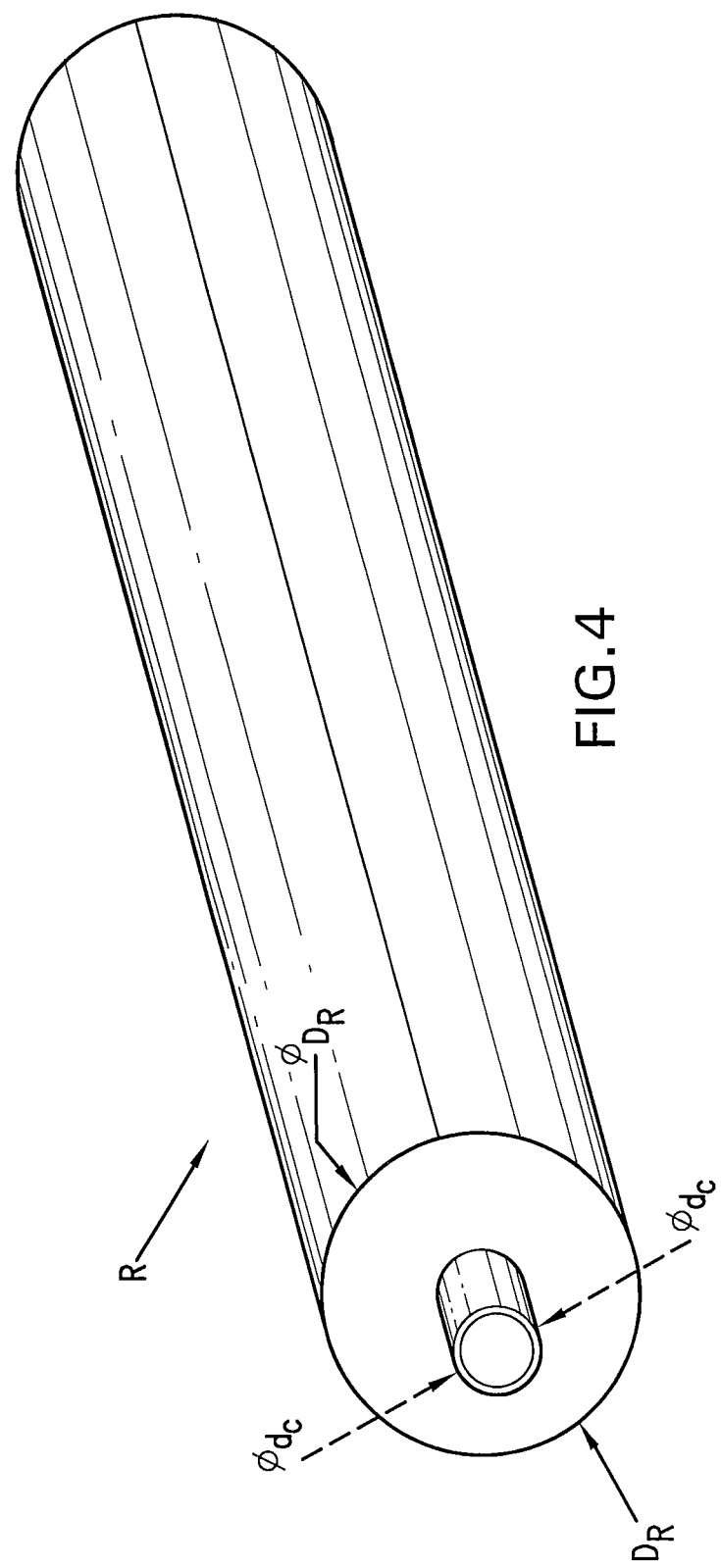
FIG. 4 is a perspective view of a roll of wrapping material in accordance with an exemplary embodiment.
Figure 6:
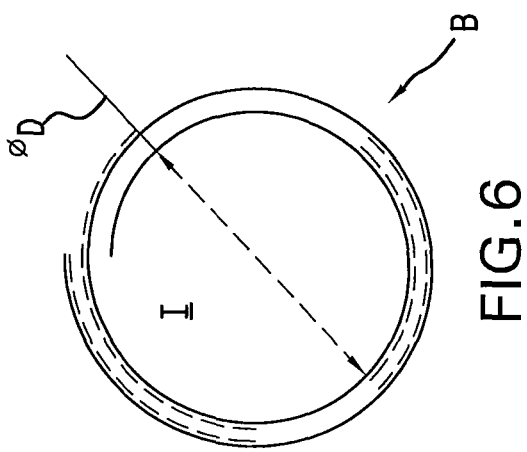
FIG. 6 is a cross-sectional view of a bale wrapped with the wrapping material in accordance with an exemplary embodiment.

FIGS. 2, 3, and 6 show cross-sectional and perspective views of a wrapping unit 150 in place and wrapped around an item I forming a bale B. The wrapping unit 150 in each of these views is shown with the spiraling wrapping unit 150 partially separated for illustrative purposes only. It should be understood that when each wrapping unit 150 is wrapped in place around the item, crop, or produce I, a portion of the leading section of base material without adhesive will contact the item I to at least partially surround the item I about its circumference, and no portion of any of the adhesive areas 120 and 122 will come into contact with any portion of the item I being wrapped.

FIGS. 2, 3, and 4 illustrates the face-to-face arrangement between each of the plurality of discrete spaced-apart adhesive areas 120 and their corresponding discrete adhesive areas 122. It can also be seen herein how the trailing edge 154 of each wrapping material unit 150 will likewise be secured and held in place at the end of a wrapping process by virtue of the discrete adhesive area 122 that terminates at the trailing edge 154. FIG. 3 shows two views of the tail portion T of the wrapping unit 150. One view shows the tail portion T flipped up to illustrate the adhesive at the trailing end 154. The other view shows the tail portion T securely held in place by the collective adhesion between the face-to-face adhesive areas. Arrow C, as shown in FIG. 3, illustrates the movement of the tail portion T from the flipped up view to the secured view.

Although illustrative embodiments have been described herein in detail, it should be noted and understood that the descriptions and drawings have been provided for purposes of illustration only and that other variations, both in form and in detail, can be added thereupon without departing from the spirit and scope of the embodiments. The exemplary embodiments are not limited to the specific materials or specific dimensions discussed herein, and have application for preparation of all wrapping materials, taking into consideration the desirable qualities of each material and the purposes for which the items are being wrapped. The foregoing specific objects and advantages of the wrapping material are illustrative of those that can be achieved and are not intended to be exhaustive or limiting of the possible advantages that can be realized. Thus, these and other objects and advantages of this wrapping material will be apparent from the description herein or can be learned from using the wrapping material, both as embodied herein or as modified in view of any variation that may be apparent to those skilled in the art. The terms and expressions have been used as terms of description and not terms of limitation. There is no limitation to use the terms or expressions to exclude any equivalents of features shown and described or portions thereof.

I claim:

1. A continuous wrapping material comprising:

a plurality of wrapping units, each one of said plurality of wrapping units comprises a predetermined length of base wrapping material that extends in a longitudinal direction and terminates with a leading edge at one end thereof and a trailing edge at an opposing end thereof, said leading edge and said trailing edge both extend said predetermined length in a width direction that is transverse to said longitudinal direction and terminate at opposing lateral edges, said each one of said plurality of wrapping units also includes a first surface and an opposing second surface, said each one of said plurality of wrapping units is serially connected to at least another one of said plurality of wrapping units at least one of the corresponding leading and trailing edges forming a continuous wrapping material;

a first plurality of discrete spaced-apart adhesive areas disposed on said first surface of the wrapping unit, wherein each wrapping unit of the plurality of wrapping units includes the first plurality of discrete spaced-apart adhesive areas, and a second plurality of discrete spaced-apart adhesive areas disposed on said second surface of the wrapping unit, wherein each wrapping unit of the plurality of wrapping units includes the second plurality of discrete spaced-apart adhesive areas;

for each specific wrapping unit, one of the leading edge or trailing edge of each specific wrapping unit is free of both first and second adhesive areas; and each of said first plurality of discrete adhesive areas are longitudinally spaced from one another, each of said second plurality of discrete adhesive areas are longitudinally spaced from one another, and said first plurality of discrete adhesive areas is longitudinally spaced from said second plurality of discrete adhesive areas so that when the continuous wrapping material is rolled onto a roll core none of the first plurality of adhesive areas comes into face-to-face contact with any one or more of said second plurality of adhesive areas and when each wrapping unit is wrapped around an item each one of the first plurality of discrete adhesive areas comes into face-to-face contact with a corresponding one of the second plurality of discrete adhesive areas, wherein at least one of said first plurality of adhesive areas adheres to a non-adhesive portion of said second surface of one of said plurality of wrapping units that is not covered by one of said second plurality of adhesive areas when the continuous wrapping material is rolled onto the roll core to ensure that the wrapping material generally remains rolled until use.

2. The wrapping material according to claim 1, wherein each of said first plurality of discrete adhesive areas and each of said second plurality of discrete adhesive areas have a width that is smaller than said width of said base wrapping material, thereby forming a non-adhesive strip at each opposing lateral edge along the length of said continuous wrapping material.

3. The wrapping material according to claim 1, wherein said base wrapping material comprises a netting, a film, a breathable material, or a combination thereof.

4. The wrapping material according to claim 1, wherein said base wrapping material comprises a film.

5. A wrapping material for wrapping agricultural produce into round bales comprising:

a continuous base wrapping material having a first surface, an opposing second surface, a thickness, a lateral width, and a longitudinal length sufficient to wrap at least the circumference of an item to be wrapped, said continuous base wrapping material including pre-defined and longitudinally spaced adhesive areas on each of said first surface and said second surface, when the wrapping material is wrapped onto a roll core a first level of adhesion between each of said adhesive areas and a corresponding overlying non-adhesive area of said wrapping material ensures that the wrapping material generally remains rolled until use and allows release of the wrapping material from the roll, and when a portion of said wrapping material is wrapped around agricultural produce a greater level of adhesion is obtained as corresponding adhesive areas are brought into face-to-face contact, wherein said adhesive areas on said first surface are longitudinally spaced from one another and from the adhesive areas on said second surface and the adhesive areas on said second surface are longitudinally spaced from one another and from the adhesive areas on said first surface, such that the continuous bale wrapping material includes a non-adhesive portion of wrapping material in between each adhesive area on said first surface, each adhesive area on said second surface, and between each first surface adhesive area and each second surface adhesive area.

6. The wrapping material according to claim 5, wherein said base wrapping material comprises a netting, a film, a breathable material, or a combination thereof.

7. The wrapping material according to claim 5, wherein said base wrapping material comprises a film.

8. A wrapping material comprising:
a base wrapping material having a first surface, an opposing second surface, a thickness, a lateral width, and a longitudinal length;

said base wrapping material including at least a first plurality of adhesive areas on said first surface and at least a second plurality of adhesive areas on said second surface, the first plurality of adhesive areas are longitudinally spaced from one another and from the second plurality of adhesive areas, and the second adhesive areas are longitudinally spaced from one another and from the first plurality of adhesive areas, wherein the longitudinal spacing includes a non-adhesive portion of wrapping material in between each adhesive area on said first surface, each adhesive area on said second surface, and in between each first surface adhesive area and each second surface adhesive area, and wherein said first plurality of adhesive areas do not overlap with adjacent second plurality of adhesive areas along the longitudinal length of the base wrapping material when said base wrapping material is rolled onto a roll core; and said first plurality of adhesive areas and said second plurality of adhesive areas each has a width that is smaller than said width of said base wrapping material, thereby forming a non-adhesive area along the length of said base wrapping material, wherein at least one of said first plurality of adhesive areas adheres to the base wrapping material when the base wrapping material is rolled onto the roll core to ensure that the wrapping material generally remains rolled until use.

9. The wrapping material according to claim 1, wherein each specific wrapping unit is free of both first and second adhesive areas along a leading section commencing from the leading edge.

* * * * *